Dec. 16, 1969  W. HEIER  3,483,811
BEVERAGE BREWING APPARATUS
Filed June 24, 1968  5 Sheets-Sheet 1

INVENTOR.
William Heier
BY 
ATTORNEY

Dec. 16, 1969   W. HEIER   3,483,811
BEVERAGE BREWING APPARATUS
Filed June 24, 1968   5 Sheets-Sheet 5

Fig. 13.

INVENTOR.
William Heier
BY Barry Moyerman
ATTORNEY

United States Patent Office 3,483,811
Patented Dec. 16, 1969

3,483,811
BEVERAGE BREWING APPARATUS
William Heier, Warminster, Pa., assignor, by mesne assignments, to Har-Wil Corporation, Warrington, Pa., a corporation of Pennsylvania
Filed June 24, 1968, Ser. No. 739,307
Int. Cl. A47j 31/40, 31/60
U.S. Cl. 99—289    17 Claims

ABSTRACT OF THE DISCLOSURE

Beverage brewing machines of a type having: (a) a dispensing station for discharging a predetermined quantity of solids from which a beverage can be brewed, (b) a brewing or infusion station and (c) a dumping station for used solids, are improved with a transport system for carrying the grounds or particulate solids, seriatim, from station (a), to (b), to (c), to (a). The apparatus includes a track spanning from station (a) to station (b), with station (c) located in an intermediate position. A transporter assembly, including a brewing cup or cavity, reciprocates on the track. On one stroke it carries solids from (a) to (b) without being effected by passing proximate (c) but, on the return stroke, it dumps its contents at (c) while enroute back to (a). The apparatus is particularly suited for use in vending applications and a coin mechanism is disclosed suitable for use in connection therewith.

BACKGROUND OF THE INVENTION

Field of the invention

This invention pertains to beverage apparatus. More particularly, it pertains to beverage infusors with provision for feeding and discharging infusive material.

Description of the prior art

The prior art in this field is extensive. Of particular pertinence are those devices of the prior art which brew a single cup of beverage at a time, utilizing a fresh supply of solids for each cup. This is an art-recognized classification, often termed a "single cup" unit. All of these units require, for automatic operation, some means of dispensing solids, infusing water through the solids and disposing of the solids after beverage values have been extracted. Briefly, transportation of solids is a key factor.

One approach has been to provide an apparatus which contains several stations including (a) a dispensing station for discharging a predetermined quantity of particulate solids such as, for example, ground coffee, from which by contact with hot water a beverage can be brewed (b) a brewing or infusion station at which a predetermined quantity of hot water may be dispensed and infused through the solids to yield a hot beverage and (c) a dumping station for receiving solids from which the beverage values have been extracted.

Devices of this type, over which the instant invention is an improvement, are exemplified inter alia by the following U.S. patents: Arduino No. 1,390,008, Valente No. 3,055,286 and Parraga No. 3,356,011. In Patent No. 1,390,008 the dispensing station for solids is described at page 2, col. 1; the brewing station at page 2, col. 2, line 10 et seq.; and the dumping station at page 3, col. 1, line 30 et seq. In Patent No. 3,055,286 the drawing indicates the dispensing station with the numeral 11 (position 22), the brewing station with the numeral 12 and the dumping station is indicated in FIGURE 2 as position 23. Finally, in Patent No. 3,356,011 the dispensing station is indicated by the numeral 130 (FIGURE 1), the brewing station by the numeral 90 and the solids dumping station by the numeral 133.

The prior art devices have all included rather elaborate mechanisms for transporting material from station to station. Of necessity, the mere number of moving parts has not been consistent with the low cost, low maintenance apparatus so much to be desired in mass markets such as the beverage vending market. Consequently, there has been a long-felt need for an inexpensive, three station, single cup brewing apparatus which is cheap to fabricate, rugged in construction and foolproof in operation.

SUMMARY OF THE INVENTION

Briefly summarized, the invention pertains to brewing machines of the single cup, three station type. Within the machine housing, the stations are arranged with the dumping station intermediate the dispensing station and the brewing station. These stations may be of any type including those shown in the patents referred to above. The stations are connected by a longitudinally extending track, preferably but not necessarily linear, on which a transporter assembly is mounted for reciprocation. The assembly carries with it, as a part thereof, a brewing cup—sometimes termed in the prior art a "brewing cavity." This cup or cavity forms an operative part of the brewing station when in liquid tight juxtaposition therewith and holds the solids (e.g. coffee grounds) through which the hot water is infused to brew the beverage.

The apparatus of the invention contains means whereby the transporter, when at the dispensing station end of the track, actuates the dispenser. It also contains means whereby, when the transporter is at the brewing end of the track, the cup is placed into liquid tight juxtaposition with the brewing station so as to temporarily form an operative part thereof.

The track and transporter assembly are provided with means for keeping the cup upright as it travels, full of solids, from the dispensing station to the brewing station. However, after the solids have been used for brewing, and the transporter is returning to the dispensing station, means are provided for inverting the cup as it approaches the dumping station and righting the cup as it leaves the dumping station. If desired, additional means may be provided for aiding the gravity expulsion of the used solids from the brewing cup.

Accordingly, it is an object of the invention to provide a brewing apparatus wherein the grounds are carried from station to station along a track which connects them and wherein, further, they are dumped only as they travel in the return direction.

It is also an object of the invention to provide a brewing apparatus, preferably coin controlled, containing relatively few moving parts and which, consequently, is inexpensive to manufacture, rugged in construction and easy to operate and service.

Still another object of the invention is to provide a single cup brewing apparatus which embodies an entirely new transport logic in its construction, said logic eliminating complicated constructions of the prior art.

These and other objects of the invention will be apparent to those skilled in the art from a consideration of the description of an exemplary embodiment of the invention which follows. It should be appreciated that the foregoing abstract and summary are intended as tools for information retrieval and are not included for purposes of limiting or interpreting the true scope of the invention. This is the function only of the appended claims.

BRIEF DESCRIPTION OF THE DRAWINGS

In the drawings, wherein like reference numerals designate like parts.

DESCRIPTION OF THE PREFERRED EMBODIMENT

Referring now to the drawings, the apparatus comprises a solids dispensing station A, a brewing or infusion station B and a dumping station C, all located within a housing D. These stations are connected by a longitudinally extending track E, on which there is mounted for reciprocation a transporter assembly F. The housing also contains a coin operated release mechanism G including means for counting the cycles of transporter assembly F.

Housing

The housing D may be of any shape or size and, in the embodiment shown is generally parallelepipedal including a left side 20, a right side 21 and a suitably removable attached front panel 22. A bottom, top and back (not shown) complete the housing and all of these parts are preferably made of heavy gauge sheet metal.

Mounted transversely across the front of panel 22 is a guideway, generally 23 (see FIGURES 11 and 13) which includes a slot 24 extending through the guideway from the front to rear across its width. At right angles to slot 24, there is further provided a guide groove 25 which extends above and below the slot and is located entirely within guideway 23. A guide ledge 26 extends rearwardly from the back of front panel 22, for a short transverse distance, and may be an integral part of the panel or a separate piece. Ledge 26 contains an intermediate coin reject slot 27. The guideway may be retained in panel 22 by attachment to an upper panel flange 29 and a lower panel flange 30.

Solids dispensing station

The solids dispensing station A, located within the housing, includes a hopper or cannister 40 which contains a supply of particulate solids (e.g. ground coffee) 41. The hopper includes a bottom discharge opening 42. The details of the cannister such as loading opening, internal agitator, cover, etc. are not shown since they form no part of the instant invention. Further, various types of dispensing stations, including those of the prior art, can be utilized. Operation of the solids dispensing station can best be understood with reference to FIGURES 1 and 2 where details of a slide valve assembly, generally 43, which is mounted beneath hopper 40 are shown.

Figure 1:
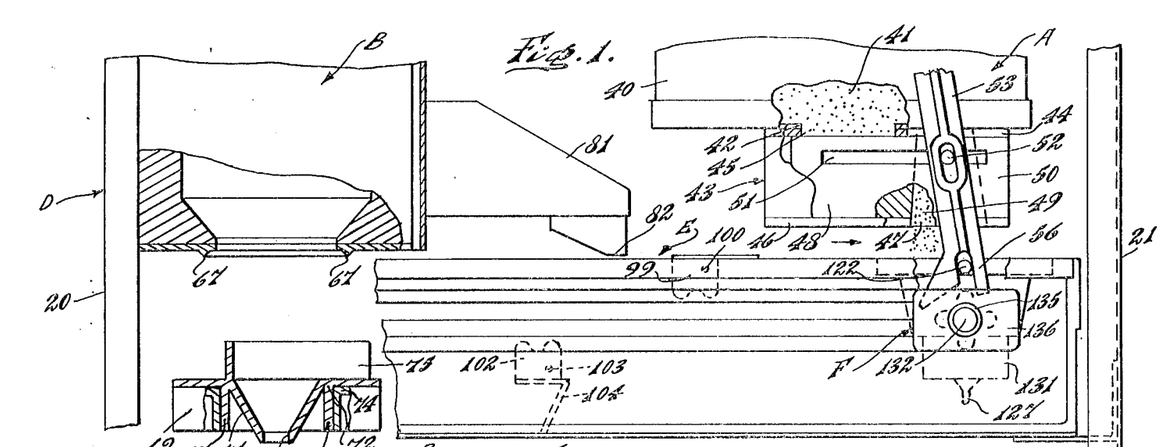
FIGURE 1 represents a fragmentary elevation, partly cut away, showing the inside of an apparatus embodying the invention with the transporter assembly adjacent the solids dispensing station.
Figure 2:
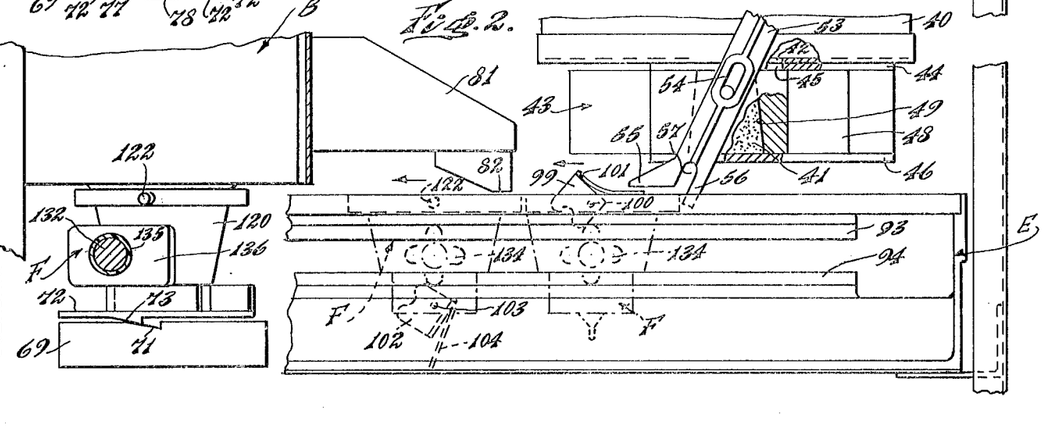
FIGURE 2 represents a fragmentary elevation, partly cut away, showing the inside of the apparatus of FIGURE 1 and differing from FIGURE 1 in that the transporter assembly is shown at the brewing station with intermediate positions of the transporter assembly shown in phantom and the arrows indicating the direction of travel.

This assembly includes an upper plate 44, having an aperture 45 therein, which is in registration with aperture 42. Dependent from plate 44 is a lower plate 46 having an aperture 47 therein which is out of registration with apertures 42 and 44. Between the plates there is mounted for reciprocation a slider valve 48 containing a cavity 49 which holds that volume of solids 41 necessary for the brewing of a single cup of beverage. The plates are tied together and the slider slideably confined therebetween by a housing 50. Protruding from the housing, through a slot 51 therein, is a slider pin 52 which is mounted in valve 50 and extends therefrom. A dispenser operating arm 53, which is pivotally attached to an upper portion of hopper 40, contains a slot 54 which receives pin 52. The distal end of the arm includes a foreshortened foot portion 55 and a stop portion 56, between which is located a detent slot 57.

Operation of the solids dispensing station, with respect to operating arm 53, will be considered. In FIGURE 1, the slider valve is shown in discharge position with cavity 49 in registration with aperture 47. In this position, the solid body of slider valve 48 blocks aperture 45, thus sealing the hopper outlet 42. In FIGURE 2, the arm 53 has been moved to the left and the slider valve is in the load position with cavity 49 in registration with aperture 45 so that solids flow into the cavity from the hopper—flow ceasing when the cavity is full. It is thus seen how movement of arm 53 between the extremes shown in FIGURES 1 and 2 results in the discharge of a predetermined quantity of particulate solids from station A. How arm 53 is actuated will be discussed below.

Brewing station

Brewing station B is located within housing D. The particular type shown includes a thick-walled hollow cylindrical reservoir 65, containing one cup of water 66. Means for heating the water, sequencing means for admitting the water to the cylinder only when the brewing cavity is in liquid-tight juxtaposition to the reservoir, and means for applying expulsion pressure to the contents of the reservoir are not shown or described since they form no part of the instant invention. However, for utilization in connection with this invention, the brewing station, of whatever suitable type is utilized, is provided with an annular knife edge 67, mounted co-axially about hot water discharge opening 68. Also provided is means for placing the brewing cup in liquid-tight juxtaposition with a mating portion of the brewing station (e.g. knife edge 67). A particularly suitable brewing station is that described in my co-pending patent application, Ser. No. 646,263, filed June 15, 1967, now Patent No. 3,413,909, issued Dec. 3, 1968.

Preferred means for placing the brewing cup in liquid-tight juxtaposition with a mating portion of the brewing station comprises a turntable elevator. The elevator includes an annular base portion 69 fixedly mounted to the housing with a bracket 70. Base 69 is circular and is co-axially mounted about the vertical center-line of opening 68. The base includes a plurality of ramps 71 radially spaced about its perimeter. Rotatably mounted on base 69 is an upper turntable portion 72, which contains a plurality of ramps 73 which mate with ramps 71. Portion 72 has a male dependent portion or extension which has an O.D. equal to the I.D. of the annular base 69 so that the extension fits therein. Rotation of portion 72 with respect to base 69 is limited by stops such as shouldered portions 74 and the rotation is preferably limited to about 20°. Also provided on upper turntable 72 is a generally squared off U-shaped enclosure 75 and, within the enclosure, on the upper face of turntable 72 there is provided a groove 76 which extends radially from the vertical center-line of the turntable assembly to the perimeter. About the center-line is provided a conical discharge funnel 77 including a brewed beverage discharge spout 78 which extends through the entire assembly and through bracket 70. Thus, a cup placed in an appropriate niche in the housing, beneath bracket 70, will receive any beverage which enters funnel 77. The niche is readily accessible from the exterior of the housing to a user of the apparatus.

Figure 13:
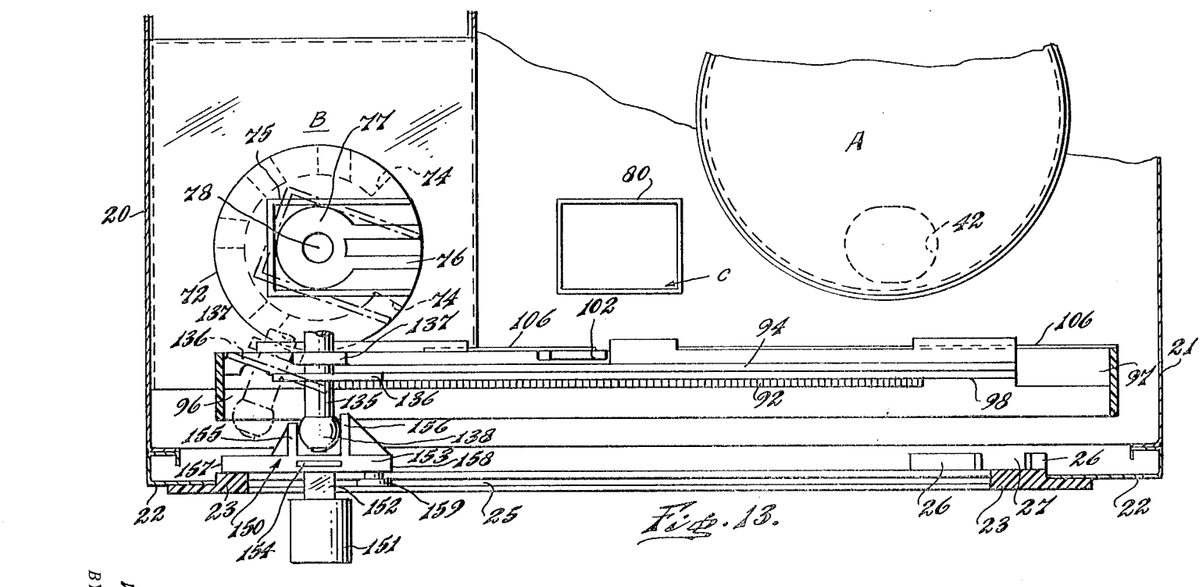
FIGURE 13 is a fragmentary plan view of the apparatus shown in FIGURE 2 with the orientation of the apparatus during the brewing or infusion operation being shown in phantom.

The upper position of the turntable elevator, in which ramps 73 are caused to ride up ramps 71 by clockwise rotation of portion 72 with respect to base 69, is illustrated in phantom in FIGURE 13 and the lower position is shown there in solid lines. The two positions may also be observed by comparing FIGURES 1 and 3. How rotation of the elevator is achieved will be discussed below in connection with the transporter assembly F.

Dumping station

Dumping station C requires little discussion. Its location, however, is of paramount importance and, as shown, it is positioned between stations A and B. Within the housing there is located a removable receptacle 80 which receives the dumped solids. The station includes a discharge assist bracket 81 which includes a dependent trigger arm 82. Arm 82 is generally positioned on the vertical center line of station C but its precise location is not critical as long as it is within the confines of the station. Further, depending on the nature of the solids being utilized, no discharge assistance may be needed to reinforce the effect of gravity.

The track

Figures 7, 8, 9, 10:
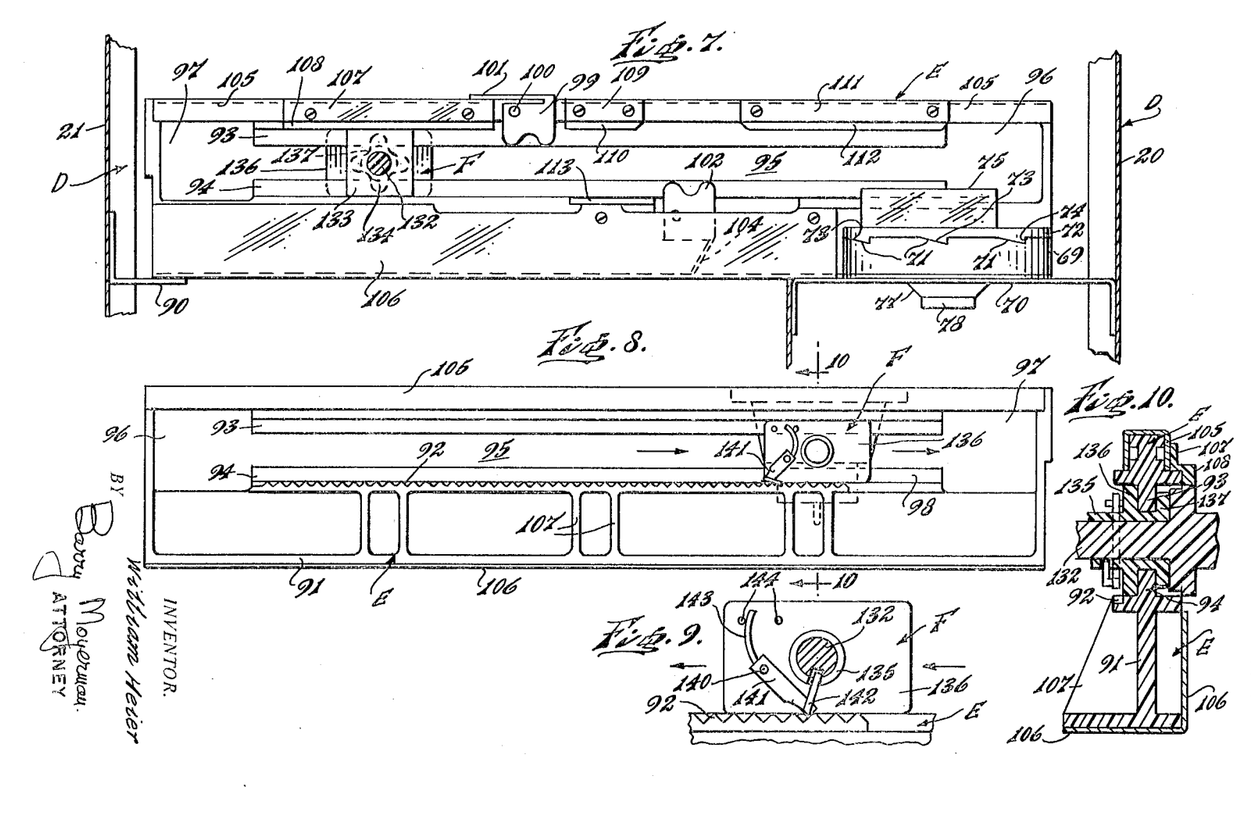
FIGURE 7 is a fragmentary rear view, partially in section, of the apparatus in the position shown in FIGURE 1.
FIGURE 8 is a partial front elevation of the transporter assembly and track, generally corresponding to the orientation thereof shown in FIGURE 7.
FIGURE 9 is an enlarged fragmentary elevation of a portion of the apparatus shown in FIGURE 8.
FIGURE 10 is a fragmentary section taken on line 10—10 of FIGURE 8.

A longitudinally extending track E spans from dispensing station to brewing station, an intermediate portion of the track passing through the dumping station. While the track is shown as linear, it may also be arcuate. The track E, as shown in FIGURES 7 and 8, is mounted in the housing on brackets such as 90 and 70 (which also supports base 69) and comprises a generally rectangular body 91 having a variety of functional elements some of which are integral and some of which are mounted thereon. Included among these elements are a ratchet 92, an upper T-beam portion 93 and a lower inverted T-beam portion 94 which, between the termini of their respective webs, define a shouldered slot 95 which extends through the track body from front to rear. Slot 95 is shorter in length than track E and ratchet 92 is shorter in length than slot 95 so that there are provided in the track assembly a section 96, proximate the brewing station B, which has neither ratchet nor slot; a similar open section 97 proximate the solids dispensing station A; and a short length of slot 98, also proximate station A, where the slot exists without its companion ratchet. The front of the track, as best seen in FIGURE 8, provides a channel consisting of the webs and flanges of beams 93 and 94 and an associated ratchet structure, through most of its length.

The rear of the track may be best understood by reference to FIGURE 7. An upper rack section 99 is pivotally mounted with a pivot pin 100 on upper beam 93 and is resiliently biased with a leaf spring 101 so that it is normally in the position shown in FIGURE 7. In a substantially identical manner, a lower rack section 102 is pivotally mounted with a pivot pin 103 on lower beam 94 and is resiliently biased with a leaf spring 104 so that it too is normally in the position shown in FIGURE 7. Beam 93 may, if desired, be stiffened by mounting over it a longitudinally extending channel 105. Lower beam 94 may be stiffened with an angle plate 106. A plurality of ribs 107 may also be provided on the front of the track (see FIGURES 8 and 10) for stiffening purposes.

The rear of the track also contains three rearward extensions of the flange of beam 93, preferably mounted on channel 105. The first of these extension pieces 107, has a projecting lip 108 and is mounted near station A between open track section 97 and upper rack section 99. The second extension piece 109, having a lip 110, is mounted between upper rack section 99 and the vertical projection of lower rack section 102. The third extension piece 111, which has a lip 112, is positioned toward brewing statiin B, between the vertical projection of lower rack section 102 and open section 96. Obviously, these various extensions may be formed as integral parts of the track. The rear flange of beam 94 may be deepened opposite these extension pieces as, for example, at 113 opposite extension piece 109.

Transporter assembly

Figures 3, 4, 6:
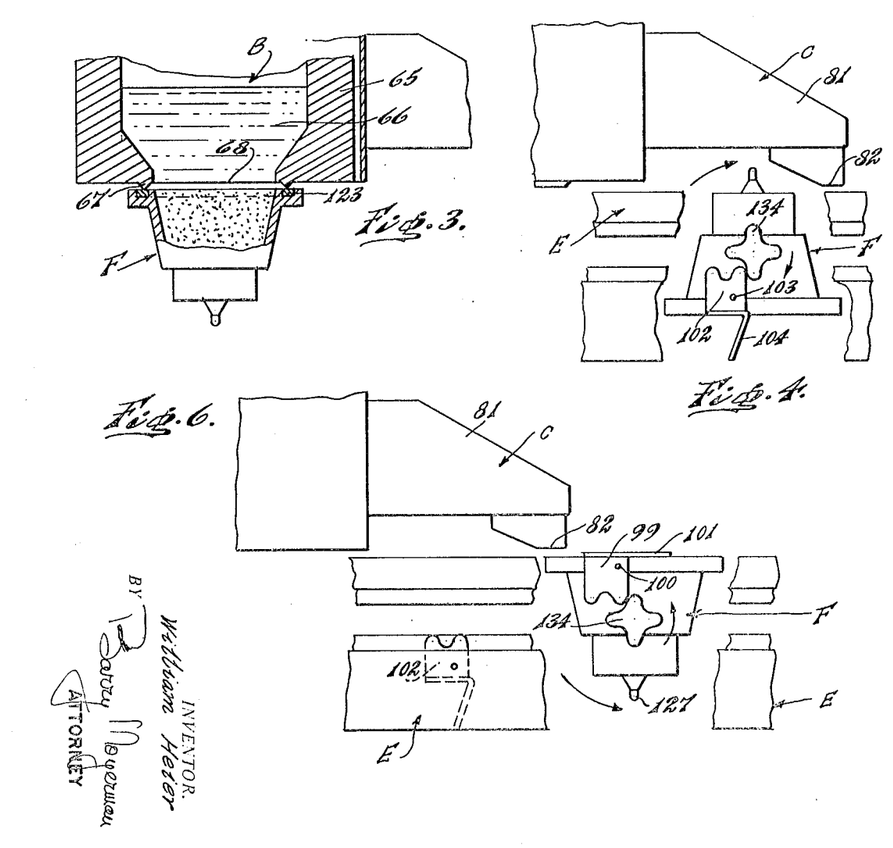
FIGURE 3 represents a fragmentary section showing the brewing cup in position for operation at the brewing station.
FIGURE 4 represents a fragmentary section showing the brewing cup arriving at the dumping station, the arrows indicating the direction of cup rotation.
FIGURE 6, which follows FIGURE 5 in sequence of operation, represents a fragmentary section showing the brewing cup leaving the dumping station, the arrows indicating the direction of cup rotation.
Figure 5:
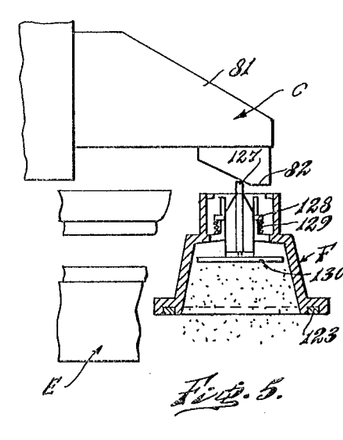
FIGURE 5, which follows FIGURE 4 in sequence operation, represents a fragmentary section showing the brewing cup ejecting grounds at the dumping station.
Figure 11:
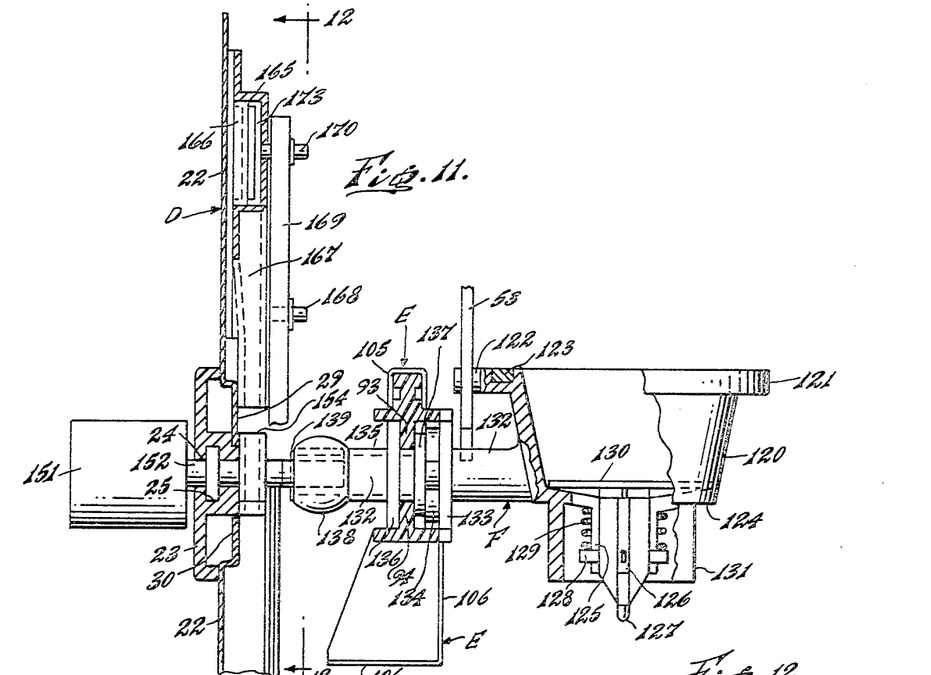
FIGURE 11 is a fragmentary side elevation, partly in section, showing details of the transporter assembly and its actuating means.

The transporter assembly F, which reciprocates on track E, is shown in FIGURE 11. The assembly includes a brewing cup 120, having a rim 121 in which is mounted a solids dispensing station activating pin 122. Rim 121 is (as shown in FIGURE 3) provided with an annular resilient gasket 123. The cup has tapered walls and a bottom 124 containing an opening from which depends an axial discharge sleeve 125. Within the cup and covering the bottom opening is a foraminous plate 130 from which depends, into the interior of sleeve 125, a guide spider comprising a plurality of fluted walls 126 terminating in a common trigger point 127. Each wall 126 is provided with a lug 128 which projects through vertical guide slots in sleeve 125 to the exterior thereof. A coil spring 129 positioned between lugs 128 and the exterior of bottom 125 keeps the lugs at one extreme of the guide slots so that plate 130 is normally in resilient juxtaposition to bottom 124. The discharge sleeve and components associated therewith are enclosed in a hollow box-like shroud 131 having external dimensions generally equal to the internal dimensions of enclosure 75 and adapted to fit closely within the enclosure. Projecting from cup 120 is a fixed solid shaft 133 on which is mounted a steadying block 133 and a pinion 134. The shaft, as shown, extends through track E. When shaft 132 rotates, the cup 120, the block 133 and the pinion 134 also rotate, being fixed thereto.

A hollow shaft 135 is mounted over the end of shaft 132 remote from the cup and shaft 132 may be appropriately reduced in diameter to receive it. This shaft carries on it a front guide block 136 and a terminal hub 137 which may be annular or rectangular in appearance. The height of guide block 136 is such that it fits between the flanges of beams 93 and 94 on the front of track E and the diameter of hub 137 is such that its fits between the flanges of these members on the rear of the track. Block 136 and hub 137 are spaced apart a distance equal to the thickness of the webs of beams 93 and 94. Shaft 135 terminates in a hollow ball 138 through which shaft 132 protrudes slightly so that it may be rotatably pinned with a lock washer 139. Thus shaft 135 serves as a slideable bushing which supports shaft 132 and which is steadied by the contact between the track and both block 136 and hub 137.

Details of guide block 136 are shown in FIGURE 9. Mounted on the face of block 136 with a pivot pin 140 is a pawl 141 which includes, as an integral part thereof, a dog 142 and a leaf spring 143. A pair of stops 144 limit motion of the spring. Shaft 135 contains a cut out 144 to receive dog 142 and shaft 132 contains a registering slot 145 in which the dog seats. When the dog is as shown in FIGURE 9, shaft 132 cannot rotate within shaft 135 and the cup is kept in fixed horizontal position.

The transporter assembly can be actuated (i.e. reciprocated) manually or with a motor and the actuating means may be coin operated or merely coin released. However, before proceeding with a description of the actuating means of the instant embodiment, this would seem an expedient point at which to explain the functional relationships of the components heretofore described.

Operation

Essential to the invention is a clear understanding of how the transporter assembly F mounts on track E. The assembly, as shown in FIGURE 11, extends from washer 139 to cup 120 and is held together as a unit by the mounting of shaft 132 within hollow shaft 135. The forward part of the assembly (i.e. shaft 135 and its integral components) can be mounted on track E by insertion from the rear through opening 97. It is then moved transversely into engagement with beams 93 and 94. As engaged, plate 136 is held in the channel defined by the webs and front flanges of beams 93 and 94. Hub 137 is held against the rear webs of these beams since the space between plate 136 and hub 137 is the thickness of the beam webs. At the same time, steadying block 133 which is functionally a part of shaft 132 is caused to abut lip 108 of extension piece 107. Finally, at the time of initial mounting, pin 122 is placed in detent slot 57 of dispenser operating arm 53. This mounting need only be done in the course of assembly or repair of the unit.

A normal operating cycle can now be considered starting with FIGURE 1, which shows the beginning of the cycle. In this position, brewing cup 120 is being filled with solids 41 flowing out of cavity 49, a flow which takes place in an instant. This flow has been caused, at the end of the previous cycle, by the action of pin 122 which slipped under foot 55 (when it was in the position shown in FIGURE 2), engaged stop 56 and then, as the assembly F continued toward the ultimate position shown in FIGURE 1, moved arm 53 to the right while the pin itself remained confined in slot 57.

The transporter assembly F now begins movement from right to left, as shown in FIGURE 2, its cup full of coffee. This is the portion of the transport cycle where to object is to move solids from station A to station B with no action occurring as station C is passed. Further, it is obviously necessary, if no solids are to be spilled, that the orientation of shafts 132 and 135 be fixed with respect to each other. Also, means are provided for preventing interruption of the cycle as by an attempted reversal of direction of transporter travel. With reference to FIGURE 2, the movement during this portion of the cycle is represented by two phantom figures and the cup 120 is shown in solid lines at the brewing station B.

Before discussing FIGURE 2, the detail shown in FIGURE 9 should be noted. This is the appearance of guide block 136 as the transporter assembly moves from right to left (i.e. from the position shown in FIGURE 1 to that shown in FIGURE 2). Pawl 141 is engaged in ratchet 92, biased opposite to the direction of travel, thus making reversal of direction impossible. Further, dog 142 penetrates through cut-out 144 into slot 145 and thus prevents rotation of shaft 132 within shaft 135. A further steadying is achieved, in those areas where extensions such as 111 exist, by contact between the block 133 and the lips of the extension. Consequently, cup 120 which is full of particulate solids, is kept horizontal—for part of its travel by block 133 and dog 142—for the other part of its travel by dog 142 alone. The orientation shown in FIGURE 9 persists all during travel toward the brewing station as long as ratchet 92 is present. However, at the terminus of the ratchet, spring 142 causes the pawl to drop and assume a substantially vertical position, ready to be biased in the opposite direction on the return stroke.

Returning now to FIGURE 2, the progress of the transporter will be observed in phantom as it travels down the track. When the transporter assembly reaches upper rack section 99, pinion 134 causes the rack to pivot in a clockwise direction and, once the assembly has passed, spring 101 restores it to the position shown in FIGURE 1. When the assembly reaches lower rack section 102, pinion 134 causes this section to pivot in a counter-clockwise direction and, after the assembly passes, spring 104 restores this section to the position shown in FIGURE 1. As the end of the track is reached, shroud 131 enters walled enclosure 75 with groove 76 accommodating trigger point 127. Linear travel of the assembly is thus halted, since enclosure 75 serves as a stop. At this point, pawl 141 is totally disengaged from ratchet 92 and the transporter assembly is in the position shown in solid lines in FIGURE 13. This figure should now be considered.

As shown in FIGURE 13, the transporter assembly F is now mounted on upper turntable 72 and is being partly supported thereby. Additional motion of shaft 135 in the direction of previous travel cannot cause additional linear travel of transporter assembly F but does cause it to disenage from the webs of beams 93 and 94 to rotate along with turntable 72 to the position shown in phantom in FIGURE 13. This rotary motion, about the vertical axis of spout 78, causes elevation of the turntable and, as shown in FIGURE 3, liquid tight contact between knife edge 67 and gasket 123. The apparatus then performs its brewing function and hot beverage discharges through spout 78. Shaft 135 is then returned to the position shown in solid lines in FIGURE 13, causing the turntable 72 to descend and the reverse stroke of the transporter assembly back to the solids dispensing station now begins.

The action on the return stroke is best observed in the series of figures designated 4, 5 and 6 (which are sequentially arranged) and also be reference to FIGURE 8.

FIGURE 8 shows the general orientation of pawl 141 during the return stroke. Note that while it engages ratchet 92, this time it is biased away from shafts 135 and 132 (i.e. away from the direction of transporter travel) so that dog 142 does not engage and, were it not for steadying block 133, shaft 132 could rotate with respect to shaft 135. This orientation of the pawl will obtain until it reaches the end of the ratchet at section 98 when it will again assume a vertical position. However, during the return stroke assuring the forward stroke, the pawl prevents reversal of direction.

At the beginning of the return stroke, contact of steadying block 133 and lip 112 prevents rotation of shaft 132. However, as the assembly reaches lower rack section 102, this lip ceases to exist. Consequently (see FIGURE 4), when pinion 134 contacts the two teeth of rack section 102 (which does not pivot in the direction the transporter is moving) shaft 132 is rotated 180° in the direction of the arcuate arrow and cup 120 is inverted over receptacle 80 at section C. It is preferred that the direction of rotation be as shown rather than in the opposite direction so that grounds are urged toward the center of the dumping station and any spill outside its bounds negatived. Still inverted, the cup is carried down the track to the position shown in FIGURE 5 where trigger arm 82 overcomes the resilience of spring 129 and depresses trigger point 127 which, in turn, displaces plate 130 to positively expel any used grounds not already dumped by gravity. For some materials an entire cake may be discharged by this action. Contact between block 133 and lip 110 keeps the shaft 132 from changing its orientation until it ceases to exist proximate upper rack section 99.

As shown in FIGURE 6, contact between pinion 134 and section 99 causes shaft 132 to rotate 180° in the direction shown by the arcuate arrow and cup 120 to be righted. For the balance of the return stroke, contact between block 133 and lip 108 prevents shaft rotation. At about this point in the cycle, pin 122 passes under foot 55, hits stop 56 and thus actuates discharge station A as shown in FIGURE 1.

Transporter actuating means

Figure 12:
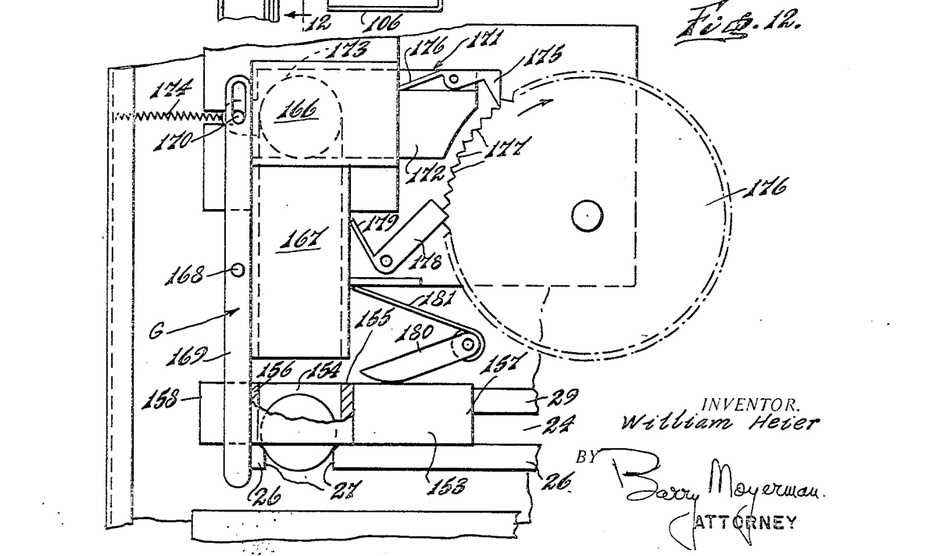
FIGURE 12 is a fragmentary section taken on line 12—12 of FIGURE 11 which shows details of the coin mechanism and cycle counter means.

The particular transporter actuating means employed in the instant embodiment is a sliding yoke, generally 150, which shrouds terminal ball 138. As seen in FIGURES 11, 12 and 13 this yoke comprises an operating handle 151 mounted on a stud shaft 152 which attached to a body portion 153. Shaft 152 extends through slot 24 and reciprocates therein. Body portion 153 includes a coin holding slot 154, a first arm 155 and a second arm 156 between which ball 138 is confined. Associated with arm 155 is a ribbed stop 157 and associated with arm 156 is a stop 158. Yoke 150 is kept steady and supported by contact between body portion 153 and flange 29 as well as by a body extension 159 which rides within groove 25.

As is apparent from FIGURE 13, reciprocation of yoke 150 causes movement of ball 138 and thus moves transporter assembly F. At the extreme position of ball 138, shown in phantom, ball 138 is still confined between arms 155 and 156 despite the operating angle necessary for elevator operation.

Coin operation

Various coin mechanisms may be used with the device. The apparatus preferred, designated generally G, is shown primarily in FIGURES 11 and 12. On panel 22 is mounted a housing 165 which includes a coin opening 166 accessible through the panel which leads to a coin chute 167. Chute 167 is in alignment with coin holding slot 154 when yoke 150 is in its between cycles location as shown in FIGURE 12. Slot 154, in turn, is centered with respect to reject slot 27. A coin box, not shown, extends along panel 22 to receive a coin coming through slot 27 as well as a coin released, as will be described below, from slot 154.

Also mounted on the housing, as with pivot pin 168, is a vertically extending lockout and counter actuating arm 169, the bottom of which is adapted to abut arm 156 but which clears guide shelf 26. The upper end of the arm contains a slot in which is received a pin 170 which is mounted on a lockout blade, generally 171, having a thick portion 172 and a thin portion 173. Portion 173, when present in the rear of opening 166 does not block chute 167 nor prevent insertion of a coin. But when portion 172 is in the rear of the opening, the chute is sealed and no coin can be inserted. Blade 170 is mounted for reciprocation in housing 165 and is resiliently biased by a spring 174 attached to housing D, the free end of which is attached to pin 170 so that arm 169 is also biased thereby. Except when arm 156 is keeping arm 169 vertical, portion 172 seals the coin opening.

Pivotally mounted on blade 171, at one extreme thereof, is a counter pawl 175 which includes a leaf spring 176 the free end of which is appropriately detented, as by resting against a small shoulder, on blade 171. The pawl moves with blade 171. Rotatably mounted on housing D is a counter wheel 176 having a plurality of teeth 177—each representing one complete cycle of transporter motion. The side of the counter facing panel 22 may bear appropriate numerical indicia which may be displayed through a cut-out in the panel. Also pivotally mounted on the panel is a dog 178 resiliently biased by a leaf spring 179 to permit rotation of wheel 176 in only one direction. A final portion of the assembly is a lockout dog 180, pivotally mounted on panel 22 and downwardly biased (with reference to FIGURE 12) by a leaf spring 181. Operation under a variety of circumstances will now be considered.

Suppose an attempt is made to operate the device without a coin. A slight movement of yoke 150 is possible—all of which will be confined to track section 98. During this motion, coin slot 154 is moved to the right (in FIGURE 12) and, since it is empty, lockout dog 180 drops into the slot whereupon further forward motion is arrested. When the direction of travel of yoke 150 is reversed, the shape of the dog permits it to come out of the slot and the unit is again ready to receive a coin.

If an undersized coin is placed in opening 166 it will pass through slot 154 and slot 27 in series and fall into the coin box. On attempted operation, the result will be the same as above since slot 154 will be empty. An oversized coin will not enter opening 166 to begin with.

With a proper size coin, the coin will lodge in slot 154, as shown in FIGURE 12 by the circle, unable to pass through slot 27. As yoke 150 is moved, dog 180 will ride over the top of the coin and not impede further motion. Once guide ledge 26 terminates (as shown in FIGURE 13) the coin is free to fall through slot 154 into the coin box below.

As soon as yoke 150 moves away from the position shown in FIGURE 12, the lower end of arm 169 no longer abuts second arm 156 and spring 174 draws blade 171 toward it, causing the thick portion 172 to block opening 166 and prevent insertion of another coin until the cycle is completed and arm 156 restores arm 169 to the vertical position shown, overcoming the force of spring 174 by so doing. At that time pawl 175 is caused to contact a tooth 177 and advance the wheel 176 by a single increment, thus recording the completion of a cycle. Dog 178 prevents reversal of wheel movement and serves as a click stop.

While the invention has been illustrated and described in detail, such description is not exhaustive of the various possible permutations of the invention. Since it will be apparent to those skilled in the art that numerous changes and modifications may be made, it is not intended that the invention be construed as limited to the specific embodiments disclosed. Rather, its scope is to be limited only by a resonable interpretation of the appended claims.

Having described my invention, I claim:

1. In a beverage brewing apparatus of a type including (i) a dispensing station for discharging a predetermined quantity of particulate solids from which, by contact with hot water, a beverage can be brewed, (ii) a brewing station for dispensing and infusing a predetermined quantity of hot water through said solids to yield a hot beverage and (iii) a dumping station for receiving solids from which beverage values have been extracted, the improvement comprising:

(a) a longitudinally extending track spanning from said dispensing to said brewing station, an intermediate portion of said track being located proximate said dumping station;

(b) a transporter assembly mounted on said track for reciprocal travel between said dispensing station and said brewing station;

(c) a brewing cup having a foraminous bottom mounted on said transporter assembly, said cup, when in liquid-tight juxtaposition with a mating portion of said brewing station, constituting a part thereof;

(d) detent means for keeping said cup upright as said transporter assembly travels from said dispensing station to said brewing station;

(e) cup rotating means, operating only as said transporter assembly travels from said brewing station to said dispensing station, for inverting said cup as said transporter approaches said dumping station and righting said cup as the transporter leaves the dumping station, and (f) means for reciprocating said transport assembly on said track; whereby the cup carries solids from dispensing station to brewing station and, after brewing occurs, dumps the solids en route to receive another charge.

2. The apparatus of claim 1 which further includes means for preventing reversal of the direction of travel of the transporter assembly on said track when the transporter assembly is between the end thereof.

3. The apparatus of claim 1 which further includes means, linked to said reciprocating means (f), for placing said brewing cup in liquid-tight juxtaposition with a mating portion of said brewing station.

4. The apparatus of claim 3 which further includes means for preventing reversal of the direction of travel of the transporter assembly on said track when the transporter assembly is between the ends thereof.

5. In a beverage brewing apparatus of a type including (i) a dispensing station for discharging a predetermined quantity of particulate solids from which, by contact with hot water, a beverage can be brewed, (ii) a brewing station for dispensing and infusing a predetermined quantity of hot water through said solids to yield a hot beverage and (iii) a dumping station for receiving solids from which beverage values have been extracted, the improvement comprising:

(a) a longitudinally extending track spanning from said dispensing to said brewing station, an intermediate portion of said track being located proximate said dumping station;

(b) a transporter assembly mounted on said track for reciprocal travel between said dispensing station and said brewing station;

(c) a brewing cup mounted on said transporter assembly, said cup when in liquid-tight juxtaposition with a mating portion of said brewing station, constituting a part thereof;

(d) detent means for keeping said cup upright as said transporter assembly travels from said dispensing station to said brewing station;

(e) cup rotating means including a rotatable shaft, on which said cup is mounted, journaled on said transporter assembly, said shaft having a pinion; a pivotally mounted inverting rack section mounted on each side of that intermediate track portion which is proximate said dumping section, contact between said pinion and each of said racks, as said transporter assembly is moving from brewing station to dispensing station, causing said shaft to rotate 180°; but contact between said pinion and each of said racks, as the transporter is moving in the opposite direction, causing only temporary pivotal displacement of said racks without causing rotation of said shaft; and (f) means for reciprocating said transport assembly on said track; whereby the cup carries solids from dispensing station to brewing station and, after brewing occurs, dumps the solids en route to receive another charge.

6. The apparatus of claim 5 wherein the rotation caused by each of said rack sections is in the same direction.

7. The apparatus of claim 5 wherein the rotation caused by each of said rack sections is opposite in direction.

8. The apparatus of claim 5 wherein each rack section is resiliently biased into the path of travel of said pinion.

9. The apparatus of claim 5 which further includes means for preventing reversal of the direction of travel of the transpotrer assembly on said track when the transporter assembly is between the ends thereof.

10. The apparatus of claim 9 wherein elevator means are provided, actuated by continued travel of said transporter assembly at the brewing end of said track, for placing said brewing cup in liquid-tight operative association with the brewing station.

11. The apparatus of claim 10 wherein coin release means are provided for preventing operation of reciprocating means (f) until an appropriate coin has been inserted.

12. The apparatus of claim 10 which further includes counter means for totallizing the number of cycles of operation of transporter assembly (b).

13. The apparatus of claim 10 wherein said brewing cup includes a base portion normally resiliently biased toward the bottom of the cup and said apparatus further includes means, operative only when said cup is inverted over the dumping section, to move said internal base portion away from the bottom of the cup and thus aid gravity dumping of solids.

14. The apparatus of claim 5 wherein elevator means are provided, actuated by continued travel of said transporter assembly at the brewing end of said track, for placing said brewing cup in liquid-tight operative association with the brewing station.

15. In a beverage brewing apparatus of a type including (i) a dispensing station for discharging a predetermined quantity of particulate solids from which, by contact with hot water, a beverage can be brewed, (ii) a brewing station for dispensing and infusing a predetermined quantity of hot water through said solids to yield a hot beverage and (iii) a dumping station for receiving solids from which beverage values have been extracted, the improvement comprising:

(a) a longitudinally extending track, including a longitudinal cutout, spanning from said dispensing to said brewing station, an intermediate portion of said track being located proximate said dumping station;

(b) a transporter assembly, mounted on said track for reciprocal travel between said dispensing station and said brewing station, comprising a sleeve extending through said track cut-out, said sleeve further including a keyway and at least one detent shoulder adapted to be slideably received by a portion of said track and thereby keep said sleeve in a fixed plane normal to said track;

(c) a brewing cup having a foraminous bottom mounted on said transporter assembly, said cup, when in liquid-tight juxtaposition with a mating portion of said brewing station, constituting a part thereof, said cup further including a cantilevered shaft journaled into said transporter sleeve and having a keyway which, when said cup is in upright position, is aligned with said sleeve keyway;

(d) means for keeping said cup upright as said transporter assembly travels from said dispensing station to said brewing station comprising a key, pivotally mounted on the transporter assembly, which enters said aligned keyways and drops out when direction of transporter travel is reversed;

(e) means, operating only as said transporter assembly travels from said brewing station to said dispensing station, for inverting said cup as said transporter approaches said dumping station and righting said cup as the transporter leaves the dumping station, and (f) means for reciprocating said transport assembly in said track; whereby the cup carries solids from dispensing station to brewing station and, after brewing occurs, dumps the solids en route to receive another charge.

16. The apparatus of claim 15 which further includes means for preventing reversal of the direction of travel of the transporter assembly on said track when the transporter assembly is between the ends thereof.

17. The apparatus of claim 15 wherein the brewing cup shaft is provided with a shouldered detent and said track is provided with a guideway to receive said shouldered detent and thereby prevent rotation of said shaft, said guideways being discontinuous in those sections of the track where shaft rotation is desired and, in those sections, rotation of said shaft being prevented solely by said key.

References Cited
UNITED STATES PATENTS

| | | | |
|---|---|---|---|
| 1,390,008 | 9/1921 | Arduino | 99—286 |
| 2,943,556 | 7/1960 | Egi | 99—289 |
| 3,055,286 | 9/1962 | Valente | 99—289 |
| 3,094,918 | 6/1963 | Mueller | 99—289 |
| 3,356,011 | 12/1967 | Parraga | 99—289 |

ROBERT W. JENKINS, Primary Examiner